US012112717B2

(12) United States Patent
Lu et al.

(10) Patent No.: US 12,112,717 B2
(45) Date of Patent: Oct. 8, 2024

(54) DRIVING METHOD FOR FLICKER SUPPRESSION OF DISPLAY PANEL AND DRIVING CIRCUIT THEREOF

(71) Applicant: Sitronix Technology Corporation, Hsinchu County (TW)

(72) Inventors: Hung-Yu Lu, Hsinchu County (TW); Rong-Fong Chen, Hsinchu County (TW)

(73) Assignee: SITRONIX TECHNOLOGY CORPORATION, Hsinchu County (TW)

(*) Notice: Subject to any disclaimer, the term of this patent is extended or adjusted under 35 U.S.C. 154(b) by 0 days.

(21) Appl. No.: 18/377,433

(22) Filed: Oct. 6, 2023

(65) Prior Publication Data

US 2024/0038188 A1 Feb. 1, 2024

Related U.S. Application Data

(62) Division of application No. 16/983,262, filed on Aug. 3, 2020, now Pat. No. 11,847,988.

(60) Provisional application No. 62/882,036, filed on Aug. 2, 2019.

(51) Int. Cl.
*G09G 3/36* (2006.01)

(52) U.S. Cl.
CPC ......... *G09G 3/3607* (2013.01); *G09G 3/3655* (2013.01); *G09G 3/3677* (2013.01); *G09G 3/3685* (2013.01); *G09G 3/3614* (2013.01); *G09G 2310/027* (2013.01); *G09G 2320/0247* (2013.01); *G09G 2320/0276* (2013.01); *G09G 2320/0673* (2013.01)

(58) Field of Classification Search
CPC .. G09G 3/3607; G09G 3/3685; G09G 3/3677; G09G 3/3655; G09G 3/3614; G09G 2320/0247; G09G 2310/027; G09G 2320/0276; G09G 2320/0673
See application file for complete search history.

(56) References Cited

U.S. PATENT DOCUMENTS 6,646,628 B2 * 11/2003 Shirochi ................ H04N 9/312 348/E9.027
7,023,458 B2 * 4/2006 Kudo ................... G09G 3/3607 345/95
7,221,348 B2 * 5/2007 Ogawa ................. G09G 3/3648 345/89

(Continued)

*Primary Examiner* — Michael J Jansen, II
(74) *Attorney, Agent, or Firm* — WPAT, P.C

(57) ABSTRACT

The present invention relates to a driving method for flicker suppression of a display panel and a driving circuit thereof. The driving circuit includes a source driving circuit and a common voltage generating circuit. The driving method includes driving the source driving circuit to generate at least one first source signal and at least one second source signal, the first source signal corresponds to at least one first pixel on a first scanning line; the second source signal corresponds to at least one second pixel on a second scanning line. The common voltage generating circuit generates at least one common voltage. While driving the first pixel and the second pixel to display the same gray scale image, the first source signal is not equal to the second source signal, or a first common voltage and a second common voltage generated by the common voltage generating circuit are different.

10 Claims, 8 Drawing Sheets

(56) References Cited

U.S. PATENT DOCUMENTS

| | | | | |
|---|---|---|---|---|
| 7,385,576 | B2 * | 6/2008 | Moon | G09G 3/3648 345/87 |
| 7,800,603 | B2 * | 9/2010 | Wang | G09G 3/3655 345/207 |
| 8,054,386 | B2 * | 11/2011 | Kim | G09G 3/20 348/553 |
| 8,068,086 | B2 * | 11/2011 | Moon | G09G 3/3648 345/98 |
| 8,098,222 | B2 * | 1/2012 | Tu | G09G 3/3655 345/98 |
| 8,253,673 | B2 * | 8/2012 | Hsu | G09G 3/3648 345/95 |
| 8,624,800 | B2 * | 1/2014 | Yang | G09G 3/3648 345/215 |
| 8,803,862 | B2 * | 8/2014 | Lee | G09G 3/3696 338/320 |
| 9,182,805 | B2 * | 11/2015 | Kim | G09G 3/3685 |
| 9,268,419 | B2 * | 2/2016 | Liao | G09G 3/3685 |
| 9,304,340 | B2 * | 4/2016 | Dai | G09G 3/36 |
| 9,330,627 | B2 * | 5/2016 | Syu | G09G 3/3696 |
| 9,489,911 | B2 * | 11/2016 | Aoki | G09G 3/3685 |
| 9,508,294 | B2 * | 11/2016 | He | G09G 3/36 |
| 9,721,515 | B2 * | 8/2017 | Syu | G09G 3/3648 |
| 9,898,954 | B2 * | 2/2018 | Chen | G09G 3/2007 |
| 10,056,025 | B2 * | 8/2018 | Jo | G09G 5/18 |
| 10,515,604 | B2 * | 12/2019 | Chung | G09G 3/3696 |
| 10,984,739 | B2 * | 4/2021 | Chen | G09G 3/2044 |
| 11,183,129 | B2 * | 11/2021 | Chen | G09G 3/3655 |
| 11,847,988 | B2 * | 12/2023 | Lu | G09G 3/3685 |
| 2002/0011984 | A1 * | 1/2002 | Shirochi | H04N 9/3105 348/E9.027 |
| 2002/0186230 | A1 * | 12/2002 | Kudo | G09G 3/3607 345/690 |
| 2003/0231155 | A1 * | 12/2003 | Ogawa | G09G 3/3648 345/89 |
| 2004/0257322 | A1 * | 12/2004 | Moon | G09G 3/3677 345/87 |
| 2005/0200588 | A1 * | 9/2005 | Kaneda | G09G 3/3655 345/98 |
| 2006/0145986 | A1 * | 7/2006 | Oh | G09G 3/006 345/92 |
| 2007/0057975 | A1 * | 3/2007 | Oh | G09G 3/3648 345/690 |
| 2007/0120772 | A1 * | 5/2007 | Kim | G09G 3/20 345/63 |
| 2007/0139343 | A1 * | 6/2007 | Wang | G09G 3/3655 345/98 |
| 2007/0188430 | A1 * | 8/2007 | Moon | G09G 3/3696 345/89 |
| 2008/0238853 | A1 * | 10/2008 | Tu | G09G 3/3655 345/98 |
| 2010/0245333 | A1 * | 9/2010 | Hsu | G09G 3/3648 345/99 |
| 2011/0227891 | A1 * | 9/2011 | Lee | G09G 3/3655 345/211 |
| 2012/0113089 | A1 * | 5/2012 | Yang | G09G 3/3648 345/98 |
| 2013/0002641 | A1 * | 1/2013 | Kim | G09G 3/3696 345/212 |
| 2013/0278639 | A1 * | 10/2013 | Liao | G09G 3/3688 345/204 |
| 2015/0015619 | A1 * | 1/2015 | Aoki | G09G 3/3696 345/690 |
| 2015/0129749 | A1 * | 5/2015 | Dai | H04N 25/772 250/214 DC |
| 2015/0206494 | A1 * | 7/2015 | Syu | G09G 3/3696 345/207 |
| 2016/0267855 | A1 * | 9/2016 | He | G09G 3/3655 |
| 2016/0343317 | A1 * | 11/2016 | Syu | G09G 3/3648 |
| 2017/0162100 | A1 * | 6/2017 | Chen | G09G 3/3655 |
| 2017/0249892 | A1 * | 8/2017 | Jo | G09G 3/2092 |
| 2018/0096666 | A1 * | 4/2018 | Chung | G09G 3/3696 |
| 2019/0325830 | A1 * | 10/2019 | Chen | G09G 3/3696 |
| 2019/0333458 | A1 * | 10/2019 | Chen | G09G 3/3677 |
| 2021/0118379 | A1 * | 4/2021 | Lu | G09G 3/3688 |

* cited by examiner

DRIVING METHOD FOR FLICKER SUPPRESSION OF DISPLAY PANEL AND DRIVING CIRCUIT THEREOF

FIELD OF THE DISCLOSURE

The present invention relates to a driving method and a driving circuit for suppressing flicker of a display panel, in particular to a driving method and a driving circuit for compensating feed-through voltage to suppress flicker of the display panel.

DESCRIPTION OF THE RELATED ART

Since the developing trend of display technology is toward thinner, lighter and planarization, many flat panel display technologies have launched the market and compete in the market, for examples, the projection displays, plasma displays, liquid crystal displays (LCD) and organic light-emitting diode displays (OLED). Now it is well known that LCD is the mainstream products in large-, medium- and small-size display market, sharing a large proportion of market share. LCD panels are the main components of LCD, massively sold in the market in module form.

When the LCD panel displays each image, the gray scale of each pixel needs to be kept for a period of time. Therefore, the liquid crystal capacitor is used as the light adjusting element, and the storage capacitor is used to charge the liquid crystal capacitor during the display period and maintain the potential of the liquid crystal capacitor.

Since LCD panel has many circuits and internal structures, many kinds of parasitic capacitances are derived that may not be one-by-one eliminated. Some parasitic capacitances are even unavoidable, affecting both the liquid crystal capacitor and storage capacitor. For example, the drain-gate parasitic capacitance (Cgd) will cause the voltage of the capacitor to shift when the scanning signal is disabled, the voltage of the liquid crystal capacitor will shift down. Thus, while using the polarity inversion driving method to drive the pixels to display the same gray scale, the parasitic capacitance will cause the two different polarity voltages of the liquid crystal capacitors to be asymmetric to the common voltage, the image displayed by the pixels will flicker and affect the display quality. Particularly when a plurality of pixels of the display panel share a source line and different gate lines enable/disable pixels, the flicker problem is more serious.

Regarding the aforesaid problems caused by parasitic capacitances, some technic personnel have proposed the pixel design by increasing the storage capacitor to compensate the voltage disturbance of liquid crystal capacitor caused by parasitic capacitance, in the prospective of reducing the flicker problem of display panels. However, increasing the storage capacitor must sacrifice the pixel aperture ratio, resulting in the decrease of screen brightness, which must increasing the brightness of backlight module or adding the bright enhancement film to improve the screen brightness, yet, the consequence is to increase the material cost and power consumption, incurring the deficiency of reducing the competitiveness of products, moreover, it would result in the products unable to comply with the safety standards and green product certification, and thus increases the difficulty of launching products to the market.

Due to the aforesaid reasons, the problem of LCD panel flicker is still the primary issue for manufacturers and academic institutions to invest huge funds and manpower every year to improve LCD panel flicker after the LCD panels have launched the market for over 40 years. At present, a driving method and a driving circuit that may suppress the flicker of LCD panel are urgently required.

The present invention provides a novel driving method and a novel driving circuit of a display panel, which may suppress the flicker problem of the display panel. When driving a plurality of pixels corresponding to different gate lines and sharing the same source line to display the same gray scale images, one way is to provide a plurality of common voltages with different voltages and a plurality of source signals having the same level, another way is to provide a plurality of source signals with different level and a single common voltage, that are used to suppress the flicker of the display panel and improve the display quality of panel.

SUMMARY

An objective of the present invention is to provide a driving method and a driving circuit for suppressing the flicker of the display panel, which drives a common voltage generating circuit to generate a first common voltage and a second common voltage. When at least one first source signal and at least one second source signal drive at least one first pixel and at least one second pixel to display the same gray scale image, at least one first source signal is identical to at least one second source signal, and the first common voltage and the second common voltage which are not equal to each other may be used to reduce or suppress the flicker problem of display panel.

Another objective of the present invention is to provide a driving method and a driving circuit for suppressing the flicker of the display panel, which drives the source driving circuit to generate at least one first source signal and at least one second source signal. When the at least one first source signal and the at least one second source signal drive at least one first pixel and at least one second pixel to display the same gray scale image, the at least one first source signal and the at least one second source signal are different and cooperate with a common voltage to reduce or suppress the flicker problem of display panel.

In one embodiment of the present invention, a driving method for suppressing the flicker of the display panel is disclosed, the method includes the following steps: driving a common voltage generating circuit to generate a first common voltage; driving the common voltage generating circuit to generate a second common voltage; driving a source driving circuit to generate at least one first source signal corresponding to at least one first pixel on a first scanning line; and driving the source driving circuit to generate at least one second source signal corresponding to at least one second pixel on a second scanning line; in which when driving the at least one first pixel and the at least one second pixel to display the same gray scale image, the first common voltage is not equal to the second common voltage, and the at least one first source signal is identical to the at least one second source signal.

In one embodiment of the present invention, a driving method for suppressing the flicker of the display panel is disclosed. The method includes the following steps: driving a source driving circuit to generate at least one first source signal corresponding to at least one first pixel on a first scanning line; driving the source driving circuit to generate at least one second source signal corresponding to at least one second pixel on a second scanning line; and driving a common voltage generating circuit to generate a common voltage; in which when driving the at least one first pixel and the at least one second pixel to display the same gray scale image, the at least one first source signal is not equal to the at least one second source signal.

In one embodiment of the present invention, a driving circuit for suppressing the flicker of the display panel is disclosed, including a source driving circuit and a common voltage generating circuit. The source driving circuit generates at least one first source signal corresponding to at least one first pixel on a first scanning line and at least one second source signal corresponding to at least one second pixel on a second scanning line. The common voltage generating circuit generates a common voltage. When the at least one first pixel is driven to display the same gray scale image as the at least one second pixel, the at least one first source signal is not equal to the at least one second source signal.

In one embodiment of the present invention, a driving circuit for suppressing the flicker of the display panel is disclosed, including a source driving circuit and a common voltage generating circuit. The source driving circuit generates at least one first source signal corresponding to at least one first pixel on a first scanning line and at least one second source signal corresponding to at least one second pixel on a second scanning line. The common voltage generating circuit generates a first common voltage and a second common voltage. When driving the at least one first pixel and the at least one second pixel to display the same gray scale image, the first common voltage is not equal to the second common voltage, and the at least one first source signal is identical to the at least one second source signal.

DETAILED DESCRIPTION OF THE EMBODIMENT

To enable the Examiner having deeper realization and understanding on the features and functions of the present invention, we hereby put the embodiment and detailed explanation in below:

In the following statements, various embodiments of the present invention will be described in detail by means of schematic interpretation. However, the concept of the present invention may be embodied in many different forms and should not be limiting to the exemplary embodiments described herein.

Some words are used to refer to specific elements in the specifications and Claims. However, a person having ordinary skill in the art should understand that the manufacturer may use different names to refer to the same element. Moreover, the specifications and Claims do not use the name difference as a way to distinguish elements, but will take the differences in overall technology of elements as the distinction criteria. "Comprising" and "Including" mentioned in the entire specifications and the claim items are an "open" language, it should be interpreted as "comprising/including but not limited to". Furthermore, the term "coupled to" includes any direct and indirect means of connection. Therefore, if a first device is described to be coupled to a second device, it means that the first device may be directly connected to the second device or indirectly connected to the second device through other devices or other means of connection.

The present invention discloses a driving method for flicker suppression of display panel and a driving circuit thereof. The flicker phenomenon of the display panel is suppressed by adjusting the common voltage or the level of the source signal. The driving method of the present invention may be applied to a structure in which plural pixels of a display panel share a source line and different gate lines enable/disable those pixels.

Figure 1:
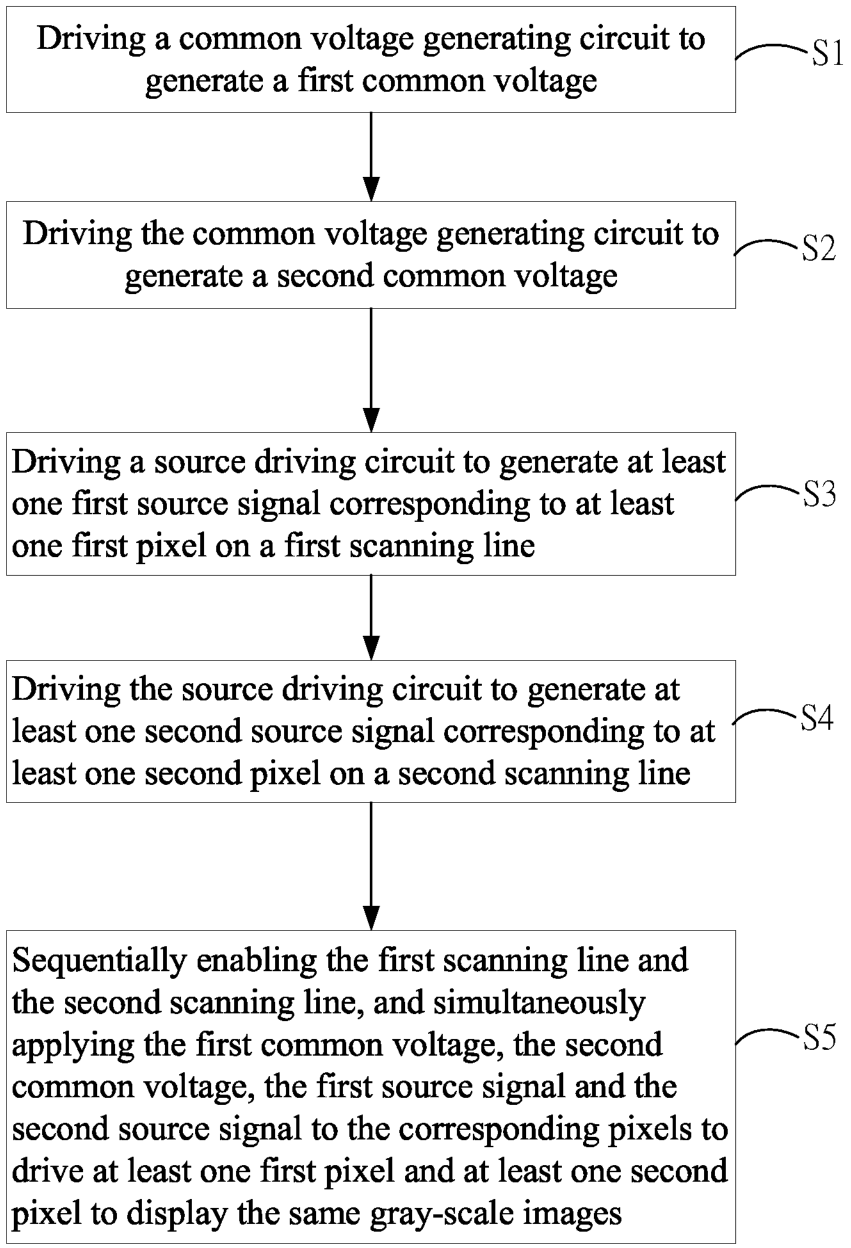
FIG. 1 shows the flowchart according to one embodiment of the present invention.

First, refer to FIG. 1, which is the flowchart of an embodiment of the present invention. As shown in the figure, the driving method for suppressing the flicker of display panel according to the present invention includes the following steps:

- Step S1: driving a common voltage generating circuit to generate a first common voltage;
- Step S2: driving the common voltage generating circuit to generate a second common voltage;
- Step S3: driving a source driving circuit to generate at least one first source signal corresponding to at least one first pixel on a first scanning line;
- Step S4: driving the source driving circuit to generate at least one second source signal corresponding to at least one second pixel on a second scanning line; and
- Step S5: sequentially enabling the first scanning line and the second scanning line, and simultaneously applying the first common voltage, the second common voltage, the first source signal and the second source signal to the corresponding pixels to drive the at least one first pixel and the at least one second pixel to display the same gray scale images. The first common voltage corresponds to the at least one first pixel, and the second common voltage corresponds to the at least one second pixel.

Figure 2:
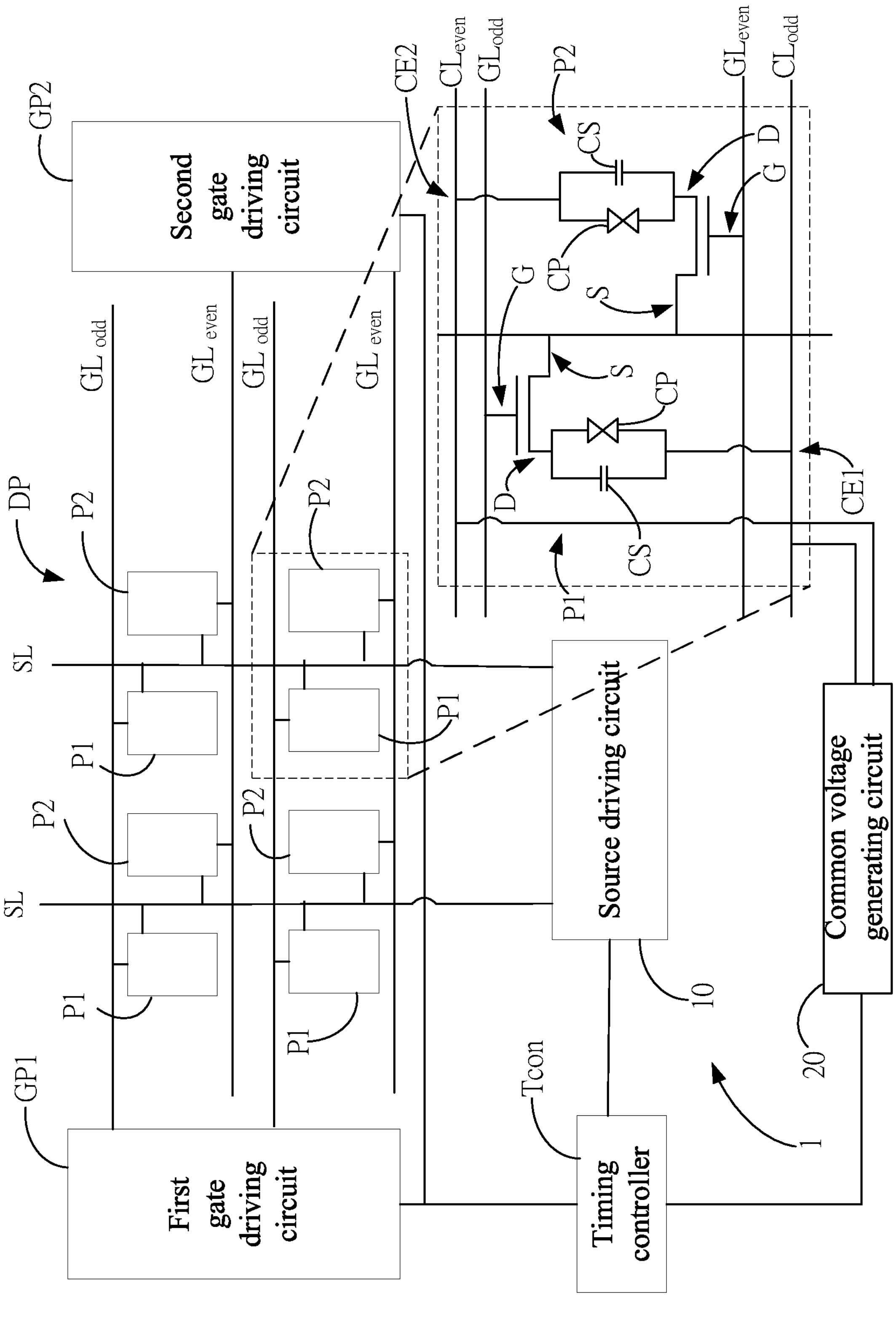
FIG. 2 shows the schematic diagram of the driving circuit driving the display panel according to one embodiment of the present invention.
Figure 3:
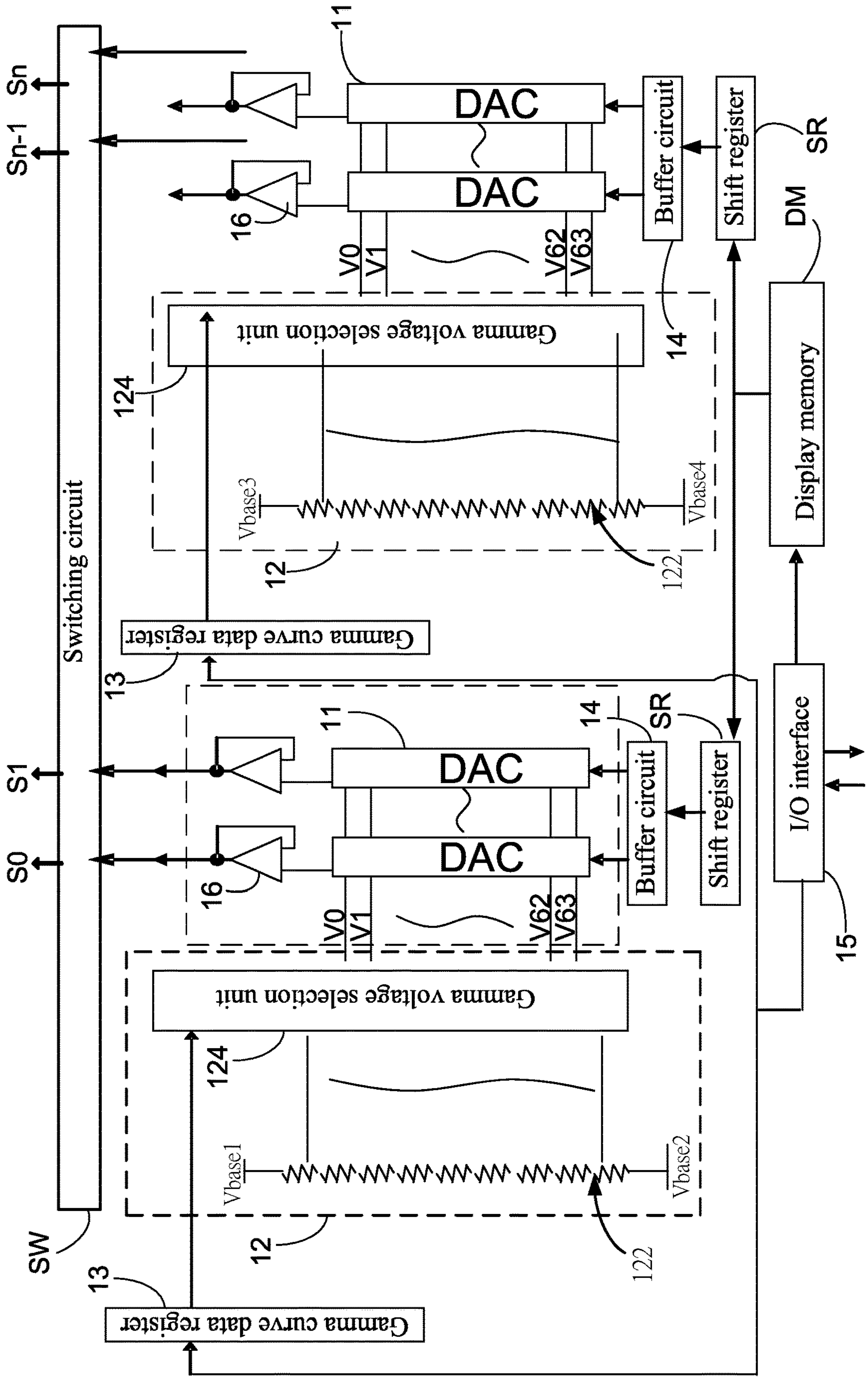
FIG. 3 shows the schematic diagram of the source driving circuit according to one embodiment of the present invention.

Next, the driving circuit applied for the driving method for suppressing the flicker of the display panel according to this embodiment as following description. Refer to FIG. 2 and FIG. 3, which are the schematic diagram of the driving circuit driving the display panel and the schematic diagram of the source driving circuit according to an embodiment of the present invention. As shown in the figures, the display panel DP includes a plurality of first pixels P1 and a plurality of second pixels P2 in array arrangement. The driving circuit 1 comprises a first gate driving circuit GP1, a second gate driving circuit GP2, a timing controller Tcon and a common voltage generating circuit 20. Each first pixel P1 and each second pixel P2 have one gate G receiving a gate driving signal, one source S receiving a source driving signal and one drain D. Each of the first pixels P1 and each of the second pixels P2 are jointly coupled to the same source line SL, and each of the first pixels P1 is coupled to the odd scanning lines GLodd, and each of the second pixels P2 is coupled to the even scanning lines GLeven. In this embodiment, the first gate driving circuit GP1 is coupled to odd scanning lines GLodd, and generates and outputs corresponding scanning signals to odd scanning lines GLodd; the second gate driving circuit GP2 is coupled to even scanning lines GLeven, and generates and outputs corresponding scanning signals to even scanning lines GLeven. As shown in FIG. 3, the source driving circuit 10 includes a plurality of digital-to-analog conversion circuit (DAC) 11, two gamma voltage generating circuits 12, two gamma curve data registers 13, two buffer circuits 14, an input and output interface 15, a display memory DM, two shift registers SR and a plurality of drive units 114. In one embodiment of the present invention, the driving units 114 may be an operational amplifier. The gamma voltage generating circuit 12 includes a voltage dividing circuit 122 and a gamma voltage selection unit 124. The circuits on the left and right sides of FIG. 3 are used to generate source signals of two different polarities and provide them to a switching circuit SW. The switching circuit SW is coupled to a plurality of source lines of the display panel to switch the source signals with different polarity to the source lines.

The timing controller Tcon is respectively coupled to the first gate driving circuit GP1, the second gate driving circuit GP2 and the source driving circuit 10 to control the operation sequence of the three devices; the first gate driving circuit GP1 is coupled to the gates G of the first pixels P1 through a plurality of odd scanning lines GLodd; the second gate driving circuit GP2 is coupled to the gates G of the second pixels P2 through a plurality of even scanning lines GLeven. The source driving circuit 10 is coupled to the sources S of the first pixels P1 and the second pixels P2 via a plurality of source lines S0~Sn; the common voltage generating circuit 20 is coupled to the common electrode CE1 of the storage capacitor CS and the liquid crystal capacitor CP of the first pixels P1 via an odd common electrode lines CLodd, and is coupled to the common electrode CE2 of the storage capacitor and the liquid crystal capacitor of the second pixels P2 via an even common electrode lines CLeven.

As shown in FIG. 3, in the source driving circuit 10, the input/output interface 15 is coupled to the display memory DM and the gamma curve data register 13. The gamma voltage generating circuit 12 is coupled to the gamma curve data register 13 and the digital-to-analog conversion circuit 11. The digital-to-analog conversion circuits 11 are coupled to the buffer circuit 14 and the gamma voltage selection unit 124 of the gamma voltage generating circuit 12 to receive a plurality of gamma voltages V0-V63. The voltage levels of the gamma voltages V0-V63 are different and correspond to different gray scales. The driving units 114 are coupled to the digital-to-analog conversion circuits 112 to receive the output signals of the digital-to-analog conversion circuits 11 and output them by the switching circuit SW. In addition, the I/O interface 15 is coupled to the display memory DM, and the display memory DM is further coupled to a plurality of shift registers SR, which are respectively coupled to the buffer circuit 14. The voltage dividing circuit 122 generates a plurality of dividing voltages, and the gamma voltage selection unit 124 receives the dividing voltages, selects partial dividing voltages according to a gamma curve data of the gamma curve data register 13, and outputs the selected dividing voltages as the gamma voltages V0-V63. The digital-to-analog conversion circuit 11 selects one of the gamma voltages V0-V63 according to the pixel data provided by the buffer circuit 14 and outputs the selected gamma voltage to the corresponding driving unit 114 to generate the source signal.

Next, the operation of each step of the driving method for suppressing the flicker of the display panel in the embodiment as following description. Refer to the FIG. 1 to FIG. 4:

As shown in Step S1, the common voltage generating circuit 20 is driven to generate a first common voltage VCOM1. In one embodiment of the present invention, the timing controller Tcon may provide the pixel data to the source driver circuit 10 to drive the first pixels P1 and the second pixels P2 to display images. The timing controller Tcon may be applied as an adjustment circuit and may generate an adjustment signal to the common voltage generating circuit 20 according to the pixel data corresponding to the first pixel P1, and the common voltage generating circuit 20 may generate the first common voltage VCOM1 according to the adjustment signal. The present invention does not limit the use of timing controller Tcon as the adjustment circuit to generate the adjustment signal, it may also use other circuits to generate the adjustment signal.

Next, as shown in Step S2, the common voltage generating circuit 20 is driven to generate a second common voltage VCOM2. The second common voltage VCOM2 is different from the first common voltage VCOM1. In an embodiment of the present invention, the timing controller Tcon may generate an adjustment signal to the common voltage generating circuit 20 according to the pixel data corresponding to the second pixel P2, and the common voltage generating circuit 20 may generate the second common voltage VCOM2 according to the adjustment signal.

As shown in Step S3, the source driving circuit 10 is driven to generate at least one first source signal corresponding to at least one first pixel P1 on an odd scanning line GLodd (a first scanning line), for example, the first pixel P1 is an odd pixel and the first source signal is a voltage of a $127^{th}$ gray scale. In this example, the gamma symmetry voltage VSF is fixed, that is, the supply voltages Vbase1, Vbase2, Vbase3, and Vbase4 of the dividing voltage circuit 122 are fixed. The voltage operating range V0P is the voltage dividing interval of the voltage dividing circuit 122, such as the voltage difference between the supply voltages Vbase1 and Vbase2, and the voltage difference between the supply voltages Vbase3 and Vbase4. In an embodiment of the present invention, Vbase1 and Vbase2 are positive voltages, and Vbase3 and Vbase4 are negative voltages.

As shown in Step S4, the source driving circuit 10 is driven to generate at least one second source signal corresponding to at least one second pixel P2 on an even scanning line (a second scanning line); for example, the second pixel P2 is an even pixel and the second source signal is also the voltage of the $127^{th}$ gray scale.

Finally, as shown in Step S5, the first scanning line (odd scanning line) and the second scanning line (even scanning line) are sequentially enabled, the first common voltage VCOM1 is applied to the common electrode CE1 of the first pixel P1 through the odd common electrode line CLodd, the second common voltage VCOM2 is applied to the second common electrode CE2 of the second pixel P2 through the even common electrode line CLeven; and the first source signal and the second source signal are applied to the corresponded first pixel P1 and second pixel P2, used to drive the first pixel P1 and the second pixel P2 to display identical gray scale images.

In which, while driving at least one first pixel P1 and at least one second pixel P2 to display the same gray scale image, the first common voltage VCOM1 of the at least one first pixel P1 is not equal to the second common voltage VCOM2 of the at least one second pixel P2, and the at least one first source signal and the at least one second source signal are the same. Thus, it may drive the at least one first pixel and the at least one second pixel to display the same gray scale image of the $127^{th}$ gray scale, the first common voltage VCOM1 is not equal to the second common voltage VCOM2, and the at least one first source signal and the at least one second source signal are the same. Since the feed-through voltage of the first pixel on the first scanning line (odd scanning line) is different from that of the second pixel on the second scanning line (even scanning line), the first common voltage and the second common voltage, which are different from each other, corresponding to the first pixel and the second pixel may compensate respectively for the feed-through voltages of the first pixel and the second pixel to suppress the flicker of the first pixel and the second pixel.

Although this embodiment is based on the configuration that two pixels share the same source line and two gate lines enable/disable the two pixels, the present invention may also be applied to the configuration in which other pixels share the same source line. For example, three pixels share the same source line, three gate lines enable/disable the three pixels, and the common voltage generating circuit provides three different common voltages in response of three different feed-through voltages to effectively suppress the flicker of display panel.

Figure 5:
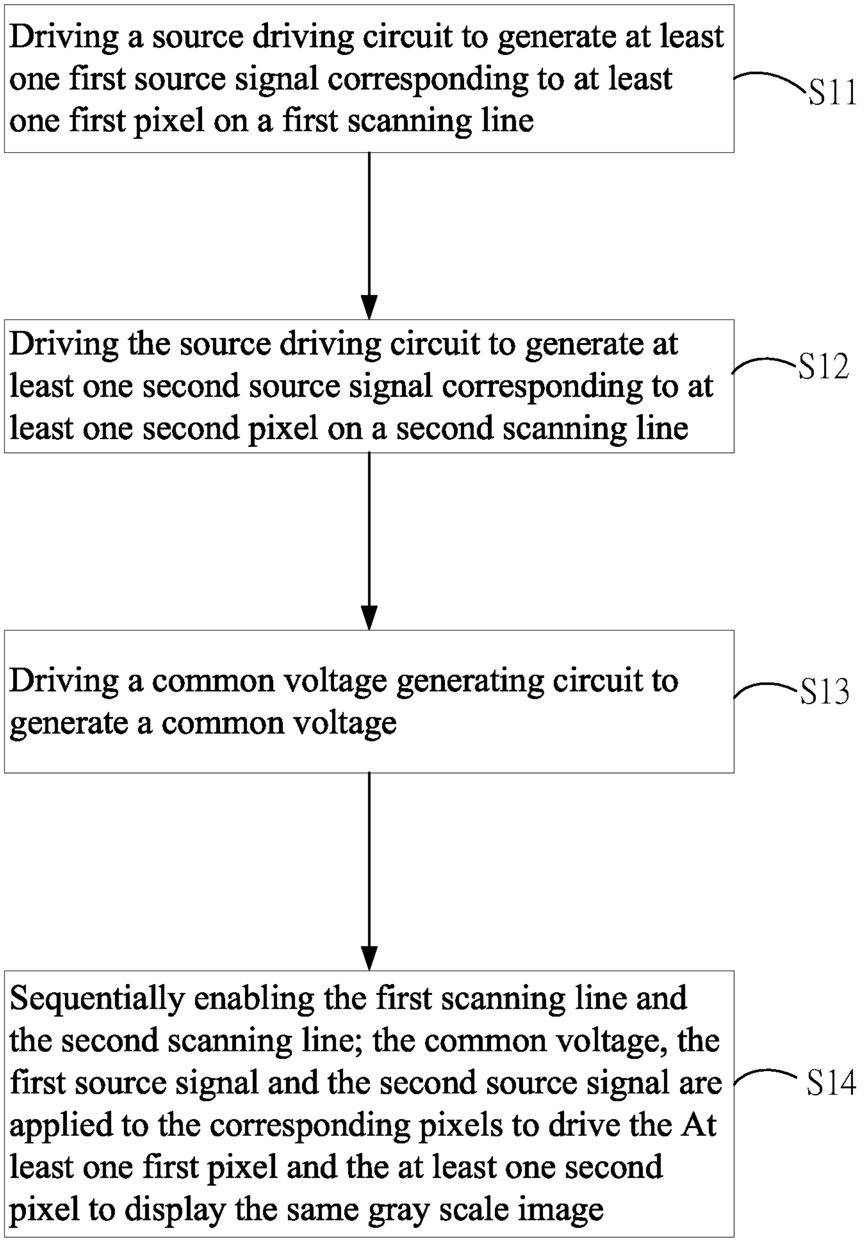
FIG. 5 shows the flowchart according to another embodiment of the present invention.

In following embodiment, the flow of the driving method for suppressing the flicker of the display panel according to another embodiment of the present invention as following description. Refer to the FIG. 5. The steps of this embodiment as following:

- S11: driving a source driving circuit to generate at least one first source signal corresponding to at least one first pixel on a first scanning line;
- S12: driving the source driving circuit to generate at least one second source signal corresponding to at least one second pixel on a second scanning line;
- S13: driving a common voltage generating circuit to generate common voltage; and
- S14: sequentially enabling the first scanning line and the second scanning line; the common voltage, the first source signal and the second source signal are applied to the corresponding pixels to drive the at least one first pixel and the at least one second pixel to display the same gray scale images.

When the at least one first pixel and the at least one second pixel are driven to display the same gray scale images, the at least one first source signal is not equal to the at least one second source signal.

Figure 4:
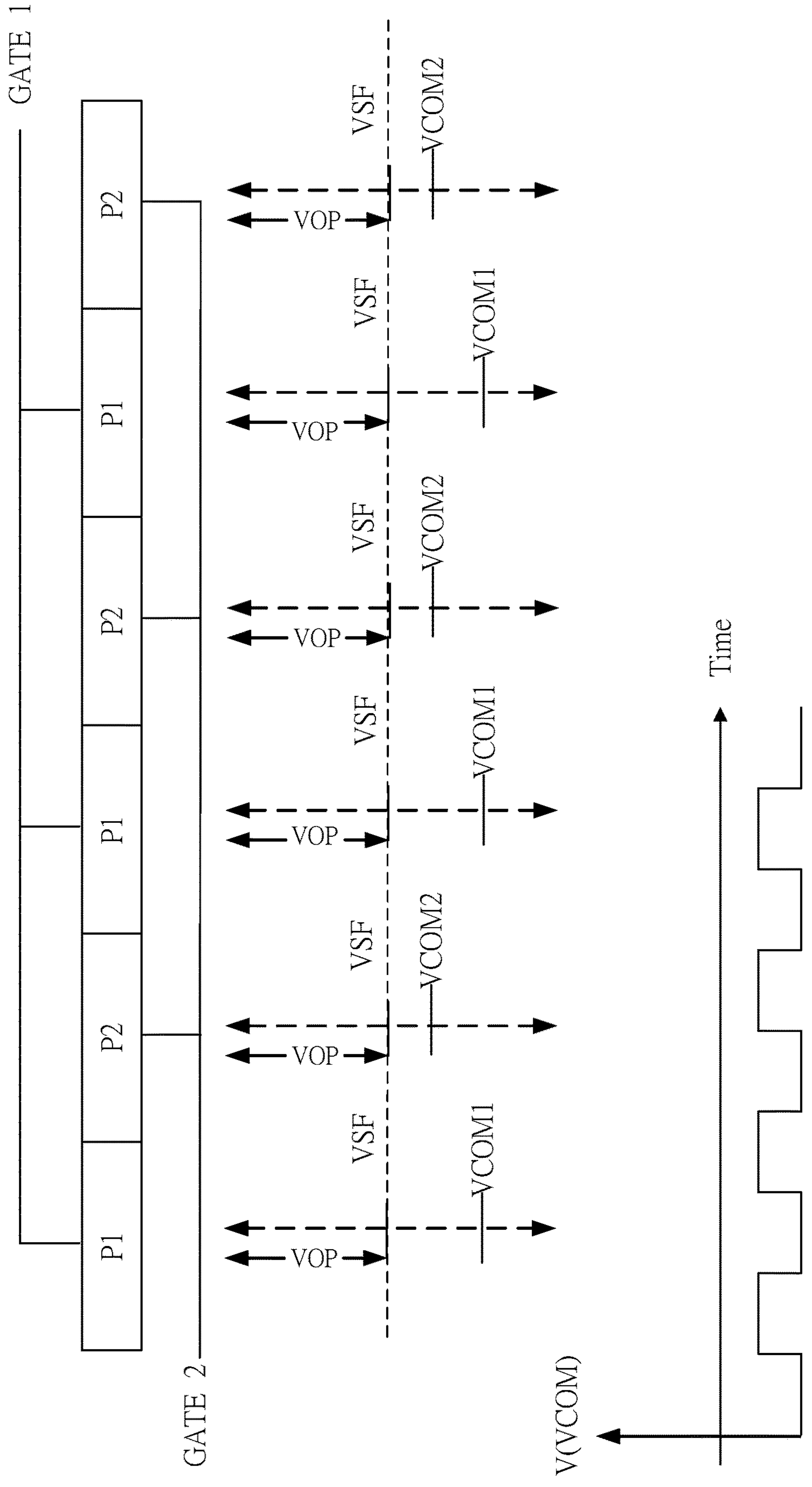
FIG. 4 shows the schematic diagram of the signals according to one embodiment of the present invention.
Figure 6:
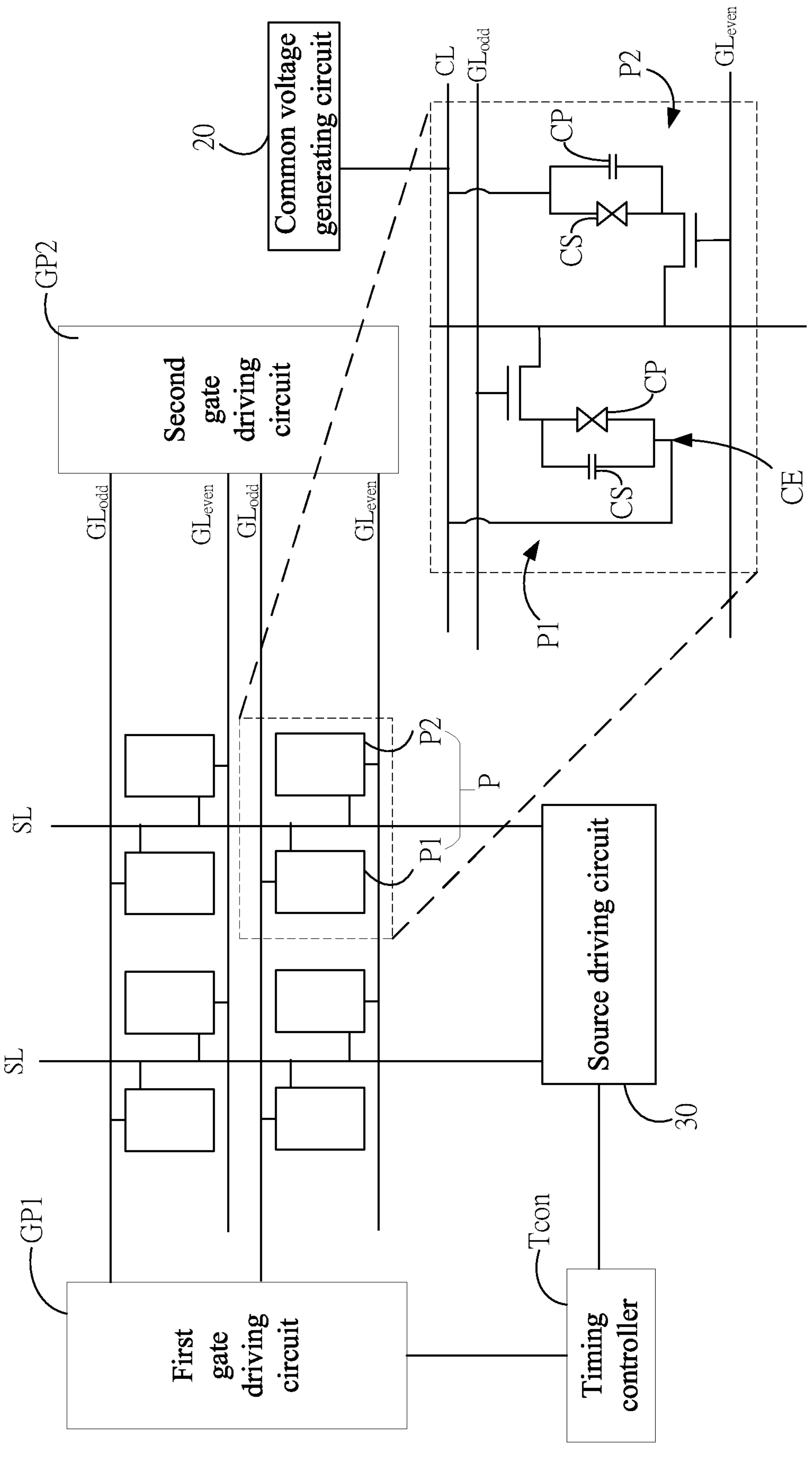
FIG. 6 shows the schematic diagram of the driving circuit driving the display panel according to another embodiment of the present invention.
Figure 7:
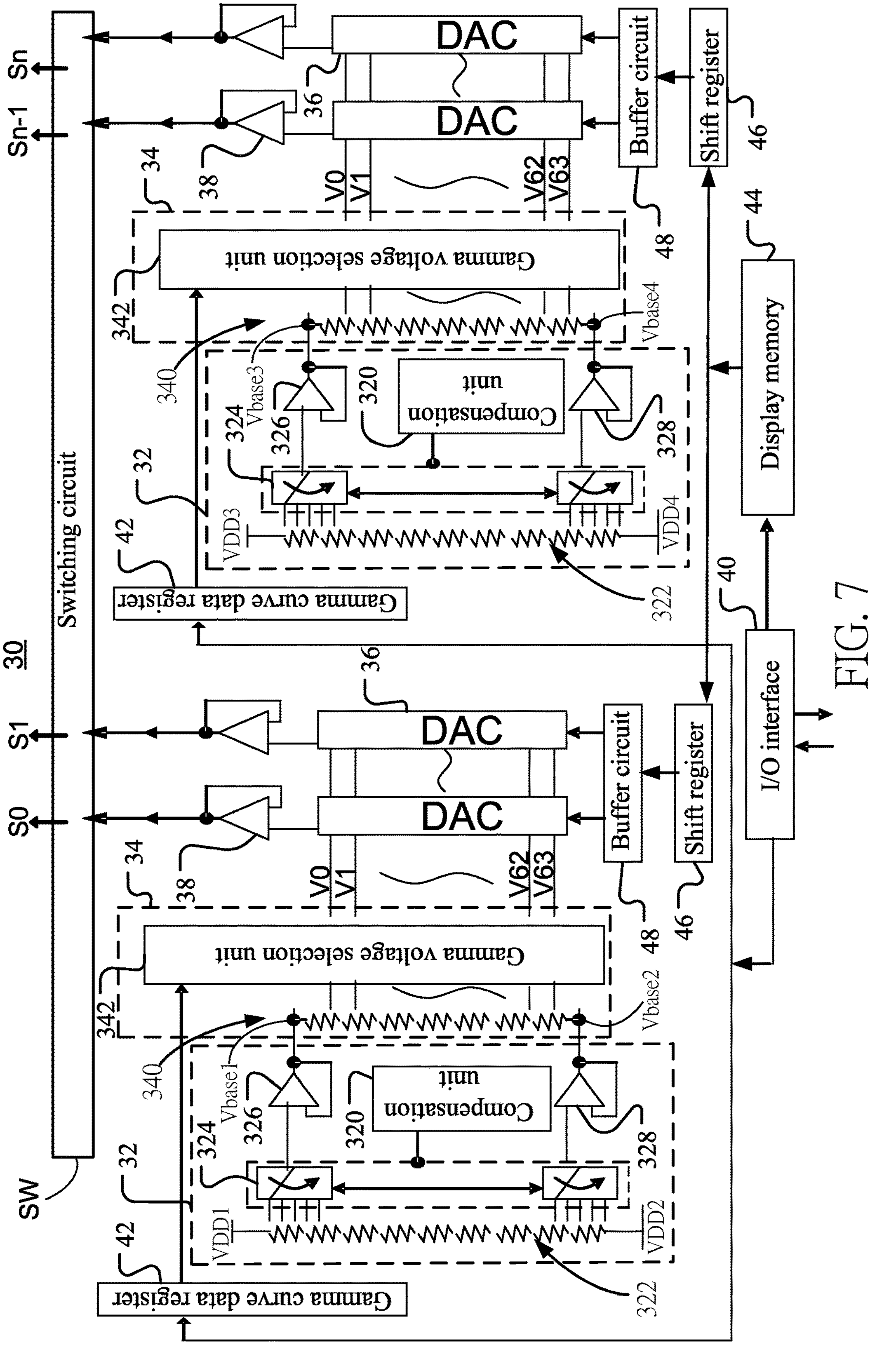
FIG. 7 shows the schematic diagram of the source driving circuit according to another embodiment of the present invention.
Figure 8:
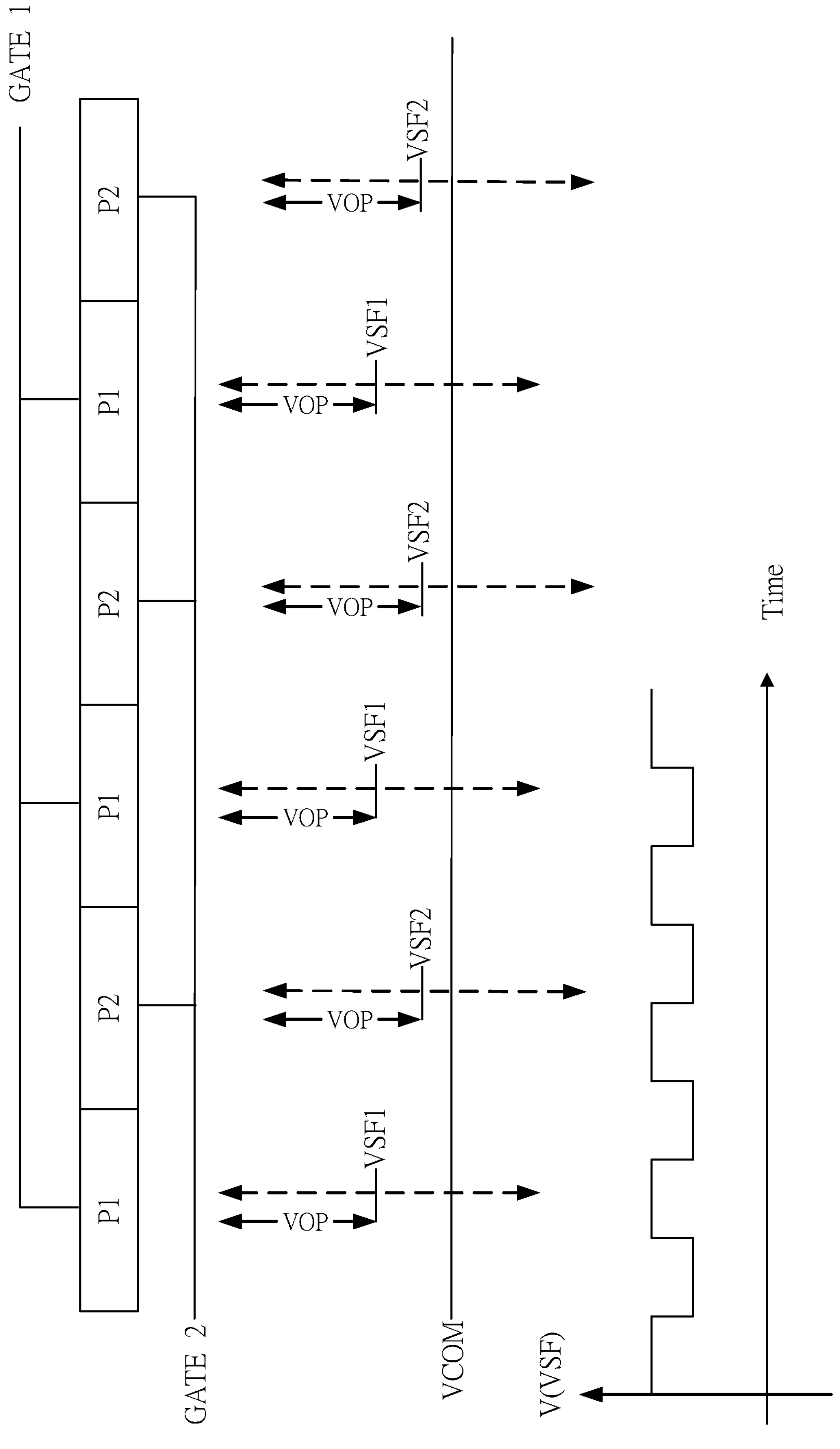
FIG. 8 shows the schematic diagram of the signals according to another embodiment of the present invention.

Next, the driving circuit that cooperates with the driving method for suppressing flicker of the display panel stipulated in this embodiment as following description. Refer to FIG. 6 and FIG. 7, which show schematic diagrams of the driving circuit driving the display panel and the source driving circuit of this embodiment. The difference between FIG. 2 and FIG. 6 is that in FIG. 6 of this embodiment, the common electrode CE of all pixels P is electrically connected to the common electrode line CL, that is, all pixels P correspond to the same common voltage, which is different from that the first pixel P1 and the second pixel P2 of the previous embodiment shown in FIG. 2 respectively correspond to the first common voltage and the second common voltage. The difference between FIG. 3 and FIG. 7 is that in FIG. 7 of this embodiment, the source driving circuit 30 further includes an adjustment circuit 32; and the difference between FIG. 4 and FIG. 8 is that the common voltage in this embodiment is fixed, the gamma symmetric voltage VSF corresponding to the first source signal of the first pixel (odd pixel) is the first gamma symmetric voltage VSF1, and the gamma symmetric voltage VSF corresponding to the second source signal of the second pixel (even pixel) is the second gamma symmetric voltage VSF2; the first gamma symmetric voltage VSF1 is different from the second gamma symmetric voltage VSF2. That is, when the source driving circuit 30 generates the first source signal, the power supply voltages Vbase1, Vbase2, Vbase3, and Vbase4 of the voltage dividing circuit 340 are adjusted, which means the reference voltage of the voltage dividing circuit 340 is adjusted, which is to adjust the first gamma symmetrical voltage VSF1 of the first source signal with positive polarity and the first source signal with the negative polarity. Similarly, when the source driving circuit 30 generates the second source signal, the power supply voltages Vbase1, Vbase2, Vbase3, and Vbase4 of the voltage dividing circuit 340 are adjusted to adjust the second gamma symmetrical voltage VSF2 of the second source signal with positive polarity and the second source signal with the negative polarity.

Moreover, the adjustment circuit 32 of this embodiment further includes a compensation unit 320, a compensation circuit 322, a switching circuit 324, a first amplification unit 326 and a second amplification unit 328. In an embodiment of the present invention, the compensation unit 320 may be a voltage dividing circuit, the voltage dividing circuit divides the voltage difference between the supply voltage Vdd1 and Vdd2 or the voltage difference between the supply voltage Vdd3 and Vdd4 to generate a plurality of adjustment signals. The switching circuit 324 is coupled to the compensation circuit 322; according to the compensation signal generated by the compensation unit 320, two of the adjustment signals are selected by the switching circuit 324 as a first and a second reference voltages. The first amplifying unit 326 is coupled to the switching circuit 324, buffering the first reference voltage and transmitting it to the voltage dividing circuit 340 as the supply voltage Vbase1 or Vbase3; the second amplification unit 328 is coupled to the switching circuit 324, buffering the second reference voltage and transmitting it to the dividing circuit 340 as the supply voltage Vbase2 or Vbase4. Voltage dividing circuit 340 divides the voltage differences between the supply voltage Vbase1, Vbase2 or Vbase3, Vbase4 to generate the dividing voltages. In one embodiment of the present invention, the compensation unit 320 may be a timing controller Tcon, which generates a compensation signal according to the pixel data. The compensation signal is also equivalent to an adjustment signal, which is used to adjust the dividing voltages, that is, to adjust the gamma voltages V0~V63, it means to adjust the source signals.

As shown in Steps S11 to S12, the running method is similar to the technology described in Steps S1 to S2 above. Refer to FIG. 7, the difference lies in the different ways of generating the first source signal and the second source signal.

As to the step of generating the first source signal, since the driving circuit has the adjustment circuit 32 in this embodiment, the dividing voltages generated by the voltage dividing circuit 340 may be adjusted. The first dividing voltages corresponds to the first pixel P1, then, the gamma voltage selection unit 342 of the gamma voltage generation circuit 34 selects the partial first dividing voltages from these first dividing voltages according to the gamma curve data and outputs the selected first dividing voltages as the first gamma voltages, and then, according to the pixel data from the buffer circuit 48, the corresponding gamma voltage is selected from the first gamma voltages V0-V63 by the digital-to-analog conversion circuit 36. Next, the driving units 38 receive the gamma voltage output from the digital-to-analog conversion circuits 36 to generate the first source signals. Finally, according to the switching signal coming from the timing controller Tcon, the switching circuit 324 outputs the first source signal to the source line.

The step of generating the second source signal by the source driving circuit 30 is the identical to the mentioned step of generating the first source signal, except that the supply voltages Vbase1, Vbase2, Vbase3 and Vbase4 supplied by the compensation circuit 32 to the dividing voltage 340 are different from the supply voltages Vbase1, Vbase1, Vbase2, Vbase3 and Vbase4 supplied for generating the first source signal, so the dividing voltage 340 generates a plurality of second dividing voltages; according to the gamma curve data, the gamma voltage selection unit 342 selects the partial second dividing voltages from the second dividing voltages and outputs the selected second dividing voltages as the second gamma voltages for the digital-to-analog conversion circuits 36 to select a corresponding gamma voltage from the second gamma voltages V0 to V63 according to the pixel data to generate the second source signal.

As shown in Step S14, the difference from Step S5 is that the common voltage in this embodiment is a fixed voltage and the first source voltage is not equal to the second source voltage.

According to the compensation signal, the adjustment circuit 32 selects the adjustment signals generated by the compensation circuit 32 through the switching circuit 324 to generate the first reference signal and the second reference signal to adjust the level of the gamma voltages for adjusting the signal levels of first and second source signals outputted by the source driving circuit 30. In this embodiment, the source driving circuit 30 adjusts the levels of the source signals of the pixels P to produce different voltage differences between the levels of the source signals and the common voltage, for compensating the pixels affected by different feed-through voltages to suppress the flicker of the display screen.

Although this embodiment is based on the configuration that two pixels share the same source line and two gate lines enable/disable the two pixels, yet, the present invention may also be applied to the configuration in which other pixels share the same source line, for example, three pixels share the same source line, three gate lines enable/disable the three pixels, and the source driving circuit provides three different source signals to respond three different feed-through voltages, which may effectively suppress the flicker of display panel.

Sum up the aforesaid statements, the present invention relates to a driving method and a driving circuit for suppressing the flicker phenomenon of the display panel, which may generate a plurality of common voltages corresponding to a source signal, or a plurality of source signals corresponding to a common voltage to display the same gray scale image to suppress or eliminate the flicker phenomenon of display panel, and thus achieves the following effects:

1. The flicker problem of the display panel may be reduced or suppressed, and the flicker problem caused by the asymmetry voltage of the liquid crystal capacitor may be avoided;
2. The flicker problem of the display panel may be reduced or suppressed without issues of additional cost and power consumption caused by reducing the screen brightness.

The invention claimed is:

1. A driving method for suppressing flicker of a display panel, comprising steps of:

driving a common voltage generating circuit to generate a first common voltage corresponding to at least one first pixel on a first scanning line;

driving the common voltage generating circuit to generate a second common voltage corresponding to at least one second pixel on a second scanning line;

driving a source driving circuit to generate at least one first source signal corresponding to the at least one first pixel on the first scanning line; and driving the source driving circuit to generate at least one second source signal corresponding to the at least one second pixel on the second scanning line;

wherein while driving the at least one first pixel and the at least one second pixel to display the same gray scale images according to the first source signal and the first common voltage applied to the at least one first pixel on the first scanning line and the second source signal and the second common voltage applied to the at least one second pixel on the second scanning line, the first common voltage is not equal to the second common voltage, and the first source signal is identical to the second source signal, based on the feed-through voltage of the at least one first pixel on the first scanning line is different from the feed-through voltage of the at least one second pixel on the second scanning line.

2. The driving method of claim 1, wherein in the step of driving a common voltage generating circuit to generate a first common voltage, the first common voltage is generated by the common voltage generating circuit according to an adjustment signal.

3. The driving method of claim 1, wherein in the step of driving the common voltage generating circuit to generate a second common voltage, the second common voltage is generated by the common voltage generating circuit according to an adjustment signal.

4. The driving method of claim 1, wherein each of the first pixel and each of the second pixel are jointly coupled to one source line.

5. A driving circuit for suppressing flicker of a display panel, comprising:

a source driving circuit, generating at least one first source signal corresponding to at least one first pixel on a first scanning line, and generating at least one second source signal corresponding to at least one second pixel on a second scanning line; and a common voltage generating circuit, generating a first common voltage corresponding to the at least one first pixel on the first scanning line and a second common voltage corresponding to the at least one second pixel on the second scanning line;

wherein when the at least one first pixel and the at least one second pixel are driven to display the same gray scale images according to the first source signal and the first common voltage applied to the at least one first pixel on the first scanning line and the second source signal and the second common voltage applied to the at least one second pixel on the second scanning line, the first common voltage is not equal to the second common voltage, and the at least one first source signal is identical to the at least one second source signal, based on the feed-through voltage of the at least one first pixel on the first scanning line is different from the feed-through voltage of the at least one second pixel on the second scanning line.

6. The driving circuit of claim 5, wherein the common voltage generating circuit generates the first common voltage and the second common voltage according to an adjustment signal.

7. The driving circuit of claim 6, further comprising an adjustment circuit generating the adjustment signal.

8. The driving circuit of claim 5, wherein the source driving circuit further comprises:

a gamma voltage generating circuit, generating a plurality of gamma voltages; and at least one digital-to-analog conversion circuit, selecting one of the gamma voltages according to a pixel data to generate the at least one first source signal and the at least one second source signal.

9. The driving circuit of claim 8, wherein the gamma voltage generating circuit comprises:

a voltage dividing circuit, generating a plurality of dividing voltages; and a gamma voltage selection unit, selecting partial dividing voltages of the dividing voltages according to a gamma curve data to generates the gamma voltages.

10. The driving circuit of claim 5, wherein each of the first pixel and each of the second pixel are jointly coupled to one source line.

* * * * *